United States Patent [19]

Abe et al.

[11] 4,173,790
[45] Nov. 6, 1979

[54] COMMUNICATION CONTROL SYSTEM

[75] Inventors: Masahiro Abe, Sayama; Yoshiaki Eifuku, Hatano; Toshio Kajiwara, Yokohama, all of Japan

[73] Assignees: Hitachi, Ltd.; Nippon Telegraph and Telephone Public Corporation, both of Japan

[21] Appl. No.: 832,584

[22] Filed: Sep. 12, 1977

[30] Foreign Application Priority Data

Sep. 10, 1976 [JP] Japan ............................. 51-107754

[51] Int. Cl.² ............................................. G06F 3/04
[52] U.S. Cl. .................................................. 364/900
[58] Field of Search ... 364/200 MS File, 900 MS File

[56] References Cited

U.S. PATENT DOCUMENTS

| 3,806,886 | 4/1974 | McClellan et al. ................... 364/900 |
| 4,028,663 | 6/1977 | Royer et al. ........................... 364/900 |

*Primary Examiner*—Gareth D. Shaw
*Assistant Examiner*—Thomas M. Heckler
*Attorney, Agent, or Firm*—Craig and Antonelli

[57] ABSTRACT

A communication control system comprises a communication control unit and a line control unit coupled to it. The former communicates with a data processor and the latter communicates with a plurality of modems. A first address signal generator in the communication control unit sends an address signal to a first decoder in the line control unit, allowing it to select one of the line adapters in the line control unit and, therefore, one of the modems coupled to the line adapter. The selected line adapter sends a signal and data if any to the communication control unit, which send a signal and data, if any, to the line control unit in response to a signal or data sent from the line control unit. A second address signal generator in the communication control unit begins to send a little later the second address signal which is the same as the first address signal to a second decoder in the line control unit, allowing it to select the same one of the line adapters as one previously selected by the first decoder. The line adapter selected by the second decoder can receive a signal and data if any, sent from the communication control unit. At the time when the signal and data are received by the line adapter selected by the first decoder, the first decoder has selected the next line adapter, because the next first address has already been sent by the first address generator. Thus, the communication control unit selects two of the line adapters at the same time allowing one to send signal and data to the communication control unit and allowing the other to receive signal and data sent from the communication control unit in response to the signal and data already sent from the line control unit.

9 Claims, 13 Drawing Figures

COMMUNICATION CONTROL SYSTEM

BACKGROUND OF THE INVENTION

The present invention relates generally to improvements in the transferring of digital data of communication networks, and more particularly pertains to a new and improved communication control system wherein data transfer between a data processor and a plurality of modems is controlled.

The prior art to which the invention is directed includes time divisional transferring of data between a plurality of modems and a data processor by way of a communication control system including a plurality of communication lines. The modems are connected to the corresponding communication lines to receive data by demodulating signals on the communication lines and send data to the communication lines by modulating digital data signals from the communication control system.

The communication control system comprises a line control unit and a communication control unit. The line control unit is connected to the modems and selects each one of the modems by scanning them in a fixed order and with a fixed repetition period, connecting the selected modem to common lines. For this operation, the line control unit comprises a plurality of line adapters, each of which is connected to a selected modem, as well as a decoder to select one of the line adapters.

An address signal is applied to the decoder from the communication control unit. The decoder selects one of the line adapters, therefore, one of the modems.

The communication control unit comprises a line memory to store data and controlling means which controls communication with the data processor and the line adapters.

For easy layout, the communication control unit and the line control unit are generally housed in different cases and are mutually connected with cables, which are as long as 50 meters for many applications. Through these long cables, address signals to select one of the line adapters are sent from the communication control unit to the decoder of the line control unit, and then control signals and data, if any, are sent from the selected line adapter to the control means in the communication control unit.

The control means modifies the data read out of the line memory according to the control signal and the data, if any, already sent from the line control unit and then writes the modified data in the line memory and now sends back a control signal and data, if any, to a selected line adapter.

These steps are required for transferring one bit of data between the communication control unit and the line control unit.

The signal propagation time for 50 meter cables is about 250 nsec. For the one cycle of operation mentioned above, 750 nsec is required for signal propagation only. Therefore, the time required for one cycle of operation of transferring one bit of data between those two units cannot be made smaller than 1 μsec. Therefore, according to the prior art, the speed of data transfer between those two units is limited and as a result, for example, the communication control system of the prior art is not fast enough for 8 communication lines of 96 k bits/sec.

SUMMARY OF THE INVENTION

It is therefore an object of this invention to provide a communication control system that control fast data transfer between a data processor and a plurality of modems.

Another object of this invention is to provide a communication control system that overcomes the speed limitation on the system due to the signal propagation time through long cables within the system.

The foregoing objects and the general purpose of this invention are accomplished by a communication control system which has first and second means for generating address signals for selection of one of the modems. The two address generating means generate an address signal corresponding to each of the communication lines in a fixed order, continuously during a fixed scanning period and cyclically with a fixed repetition period. The second address signal generator outputs the same address as is generated by the first address signal generator and a little later than the first address generator does it. The line control unit comprises first and second decoders, each of which is responsive to the first and the second address signals, respectively. The first decoder is used to select one of the line adapters, allowing the selecting line adapter to output a signal and data, if any, to the communication control unit. The second decoder is used to select the same line adapter, allowing the selected line adapter to receive a signal and data, if any, sent from the communication control unit in response to receiving the signal and data sent from the line adapter selected before. At the time when the second decoder selects the one line adapter, the first decoder already completes the selection of the next line adapter. Thus, the communication control unit of the present invention selects two line adapters at the same time, allowing one to send a signal and data, if any, to the communication control unit and the other to receive a signal and data, if any, sent from the communication control unit in response to the already received signal and data.

BRIEF DESCRIPTION OF THE DRAWING

Other objects and the attendant advantages of this invention will be readily appreciated as the same becomes better understood by reference to the following detailed description when considered in connection with the accompanying drawings in which like reference numerals designate like parts throughout the figures thereof and wherein:

FIG. 9(a) is an example of the format of a data stored in the line memory used in FIG. 1.

FIG. 9(b) shows an example of the meanings of the command data CMD stored in the line memory used in FIG. 1.

FIG. 9(c) shows an example of the meanings of the status data ST stored in the line memory of FIG. 1.

DESCRIPTION OF THE PREFERRED EMBODIMENTS

Figure 1:
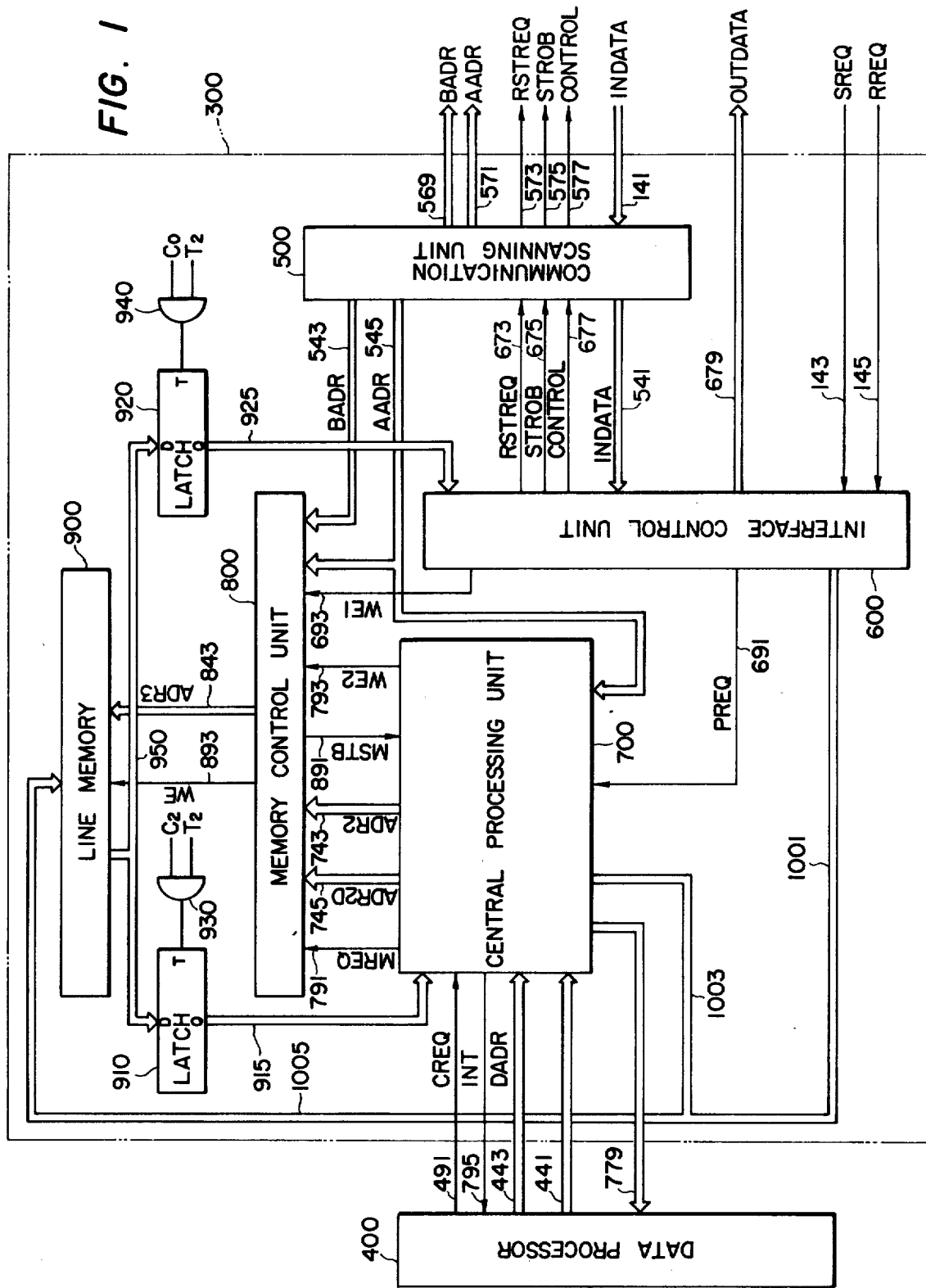
FIG. 1 shows a block diagram of a communication control unit of the communication control system of this invention and the conventional data processing unit.
Figure 2:
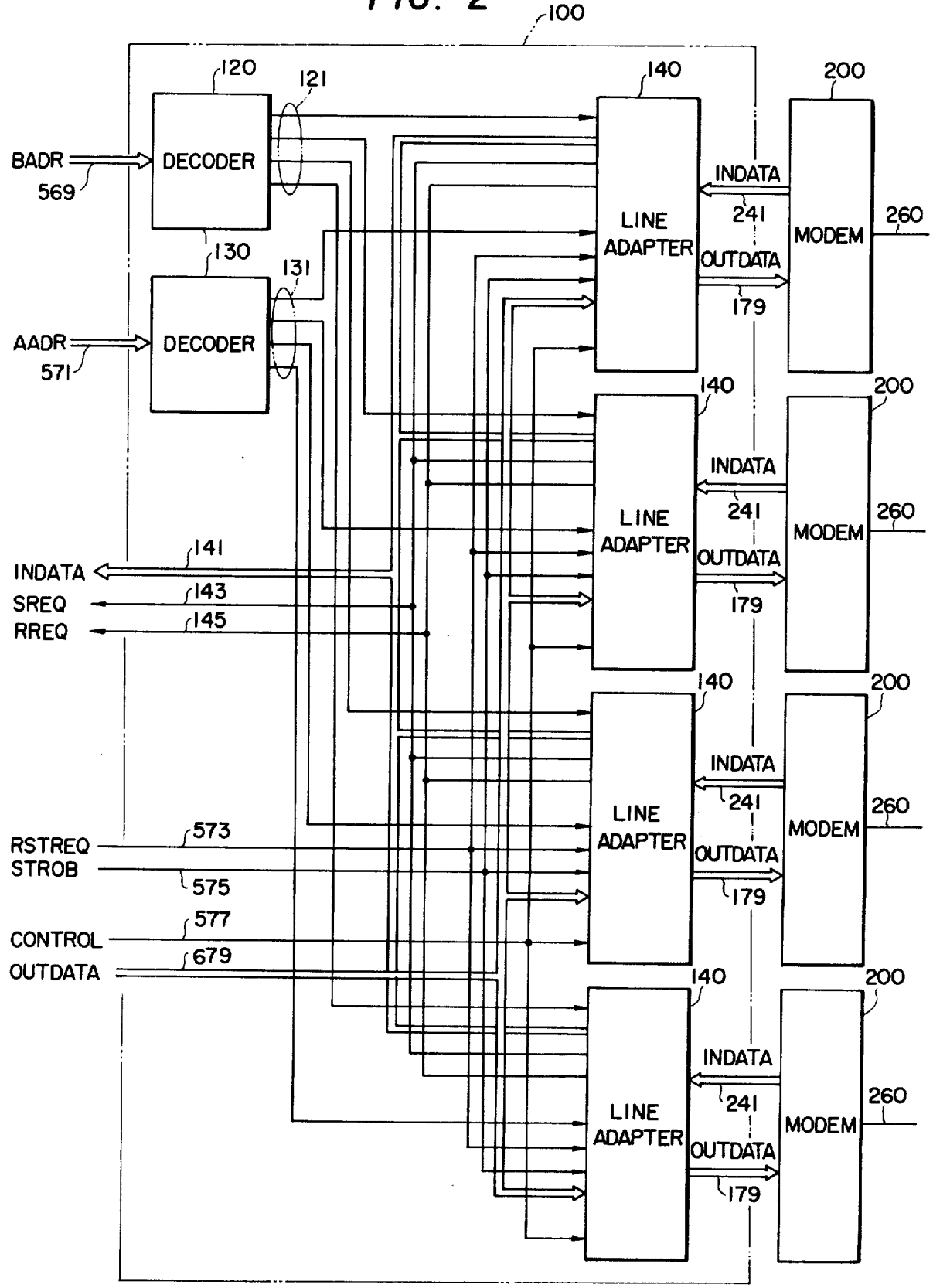
FIG. 2 shows a block diagram of the line control unit of this invention and the conventional modems.

The communication control system of the present invention as seen in FIGS. 1 and 2, contains a communication control unit 300 (CCU) and a line control unit 100 (LCU). The communication control unit 300 communicates with a data processor 400 and the line control unit 100, which in turn communicates with a plurality of modems 200. Data from the data processor 400 is transferred to the modems 200 by way of the communication control unit 300 and the line control unit 100 to be sent to a remote terminal unit through communication lines 260. Data received by the modems from the communication lines is transferred to the data processor by way of the LCU and the CCU.

Referring to FIG. 1, communication control unit 300 of this invention comprises a central processing unit (CPU) 700, a memory control unit (MCU) 800, a line memory 900, a communication scanning unit (CSU) 500 and an interface control unit (ICU) 600.

Referring to FIG. 2, line control unit 100 of this invention comprises two decoders 120, 130 and four line adapters 140, each connected to one of four communication lines 260 by way of the corresponding modem 200.

The line adapters 140 and modems 200 of this embodiment are supposed to provide full duplex communication channels of 96 k bit/sec. Therefore each pair of a line adapter 140 and a modem 200 and a communication line 260 equivalently provides one pair of communication channels, one for receiving data and the other for sending data. Therefore 8 communication channels are obtained in this embodiment, each of which will be referred to with a different number from 0 to 7.

Each of these 8 communication channels are periodically and repeatedly connected to the communication control unit 300 with a fixed order and with a fixed repetition period. The selection of one of the communication channels is accomplished with the application of respective address signals to the line control unit 100 from the communication control unit 300. The period with which the address signals change is termed a scanning period. When the time equal to the scanning period has passed after one of the communication channels has been selected, the next communication channel begins to be selected. In this embodiment, the scanning period is supposed to be 800 nsec. Therefore, the repetition period with which each of the communication channels is selected repeatedly, is equal to 6.4 μsec, which is enough for 96 k bit/sec communication over 8 communication channels.

To provide a background for and a better understanding of our invention, a brief explanation of the functions and interrelationship of principal units in the communication control unit 300 and the line control unit 100 will be given first.

The CPU 700 is provided to communicate with the data processor 400. In this regard, the CPU 700 receives control command data for the interface control unit 600 and the modems as well as for sending data from the data processor 400, and stores this data in the line memory 900. The CPU 700 also sends to the data processor 400 modem monitor data as well as received data, which has been sent from the line adapters 140 and modems 200 and has been stored in the line memory 900.

The interface control unit 600, reading the line memory 900, sends data selected from the data read out from the memory to the corresponding line adapters 140 in the line control unit 100. The interface control unit 600 is also provided to receive modem monitor data signals from modems 200 as well as received data by way of line control unit 100 and communication scanning unit 500. The interface control unit 600 sends or receives this data when signals SREQ or RREQ are input to interface control unit 600 from the line adapters 140. The interface control unit 600 sends a signal RSTREQ, STROB or CONTROL, answering the signal SREQ or RREQ.

The communicating scanning unit 500 is provided to generate two address signals BADR and AADR to scan the communication channels as well as to scan the line memory 900 in a fixed order and with a fixed repetition period. The control scanning unit 500 sends address signals BADR and AADR to the decoders 120 and 130 of the line control unit 100 as well as to memory control unit 800. The address signals sent to the decoders 120 and 130 are used to select the communication channels. The address signals sent to memory control unit 800 are used when interface control unit 600 writes or reads out the line memory 900.

The address signal AADR is also sent to CPU 700, where it is used to generate address signals ADR2, ADR2D which are used when CPU 700 writes or reads out the line memory 900. It is to be noted that two address signals BADR and AADR are generated in this invention. The two signals are both address signals which are changed from 0 to 7 repeatedly and periodically in the ascending order but the signal AADR is changed to the same address signal as the signal BADR, 400 nsec after the signal BADR is changed. The period 400 nsec is equal to half the scanning period.

The memory control unit 800 is provided to control reading or writing of the line memory 900 and selects a memory access address signal (ADR3) from memory access address signals ADR2D and ADR2 from CPU 700 and BADR and AADR from communication scanning unit 500 depending on applied clock signals. The memory control unit 800, receiving a write enable signal WE1 from CPU 700 or WE2 from interface control unit 600, generates a write enable signal WE, demanding the line memory 900 to write data on a bus 1005.

The line memory 900 is a memory which stores data for each communication channel at a corresponding address location. In this embodiment, where full duplex communication is applied, the line memory 900 comprises 8 areas, each corresponding to one of the 8 communication channels.

Figures 8, 9:
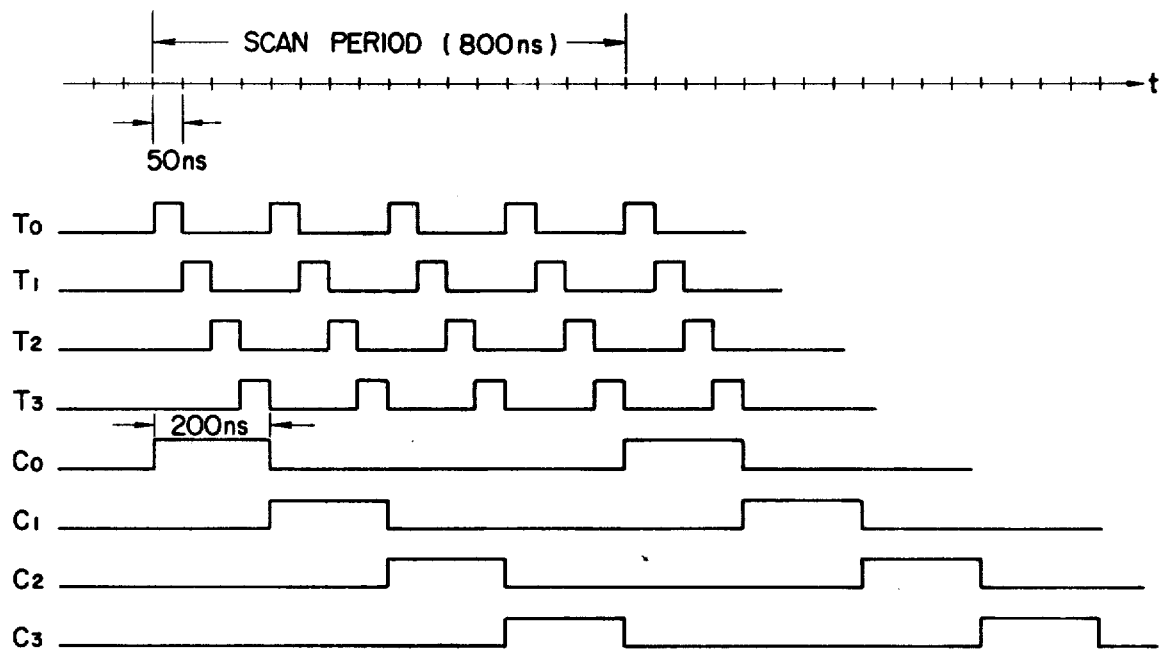
FIG. 8 shows various clock signals used in the communication control unit of FIG. 1.

Referring to FIG. 8, clock signals used in communication control unit 300 are composed of two types of clock signals. One type of clock signals is $T_0$, $T_1$, $T_2$, $T_3$, which have a duration of 50 nsec and a period of 200 nsec. Each clock signal $T_0$, $T_1$, $T_2$, or $T_3$ starts 50 nsec later than the foregoing clock. Another type of clock signal signals is $C_0$, $C_1$, $C_2$, and $C_3$, which have a duration of 200 nsec and a period of 800 nsec, equal to the scanning period.

These two types of clock signals are mutually synchronous and, while one of the second type of clocks signals is generated, the four first type of clock signals are generated, as shown in FIG. 8. In the explanation below, the symbols Ci, Tj will be also used to indicate a period when the clock signals Ci, Tj are generated. For example, a period when clock signals $C_1$, $T_2$ are both generated is referred to as a period ($C_1$, $T_2$).

Figure 3:
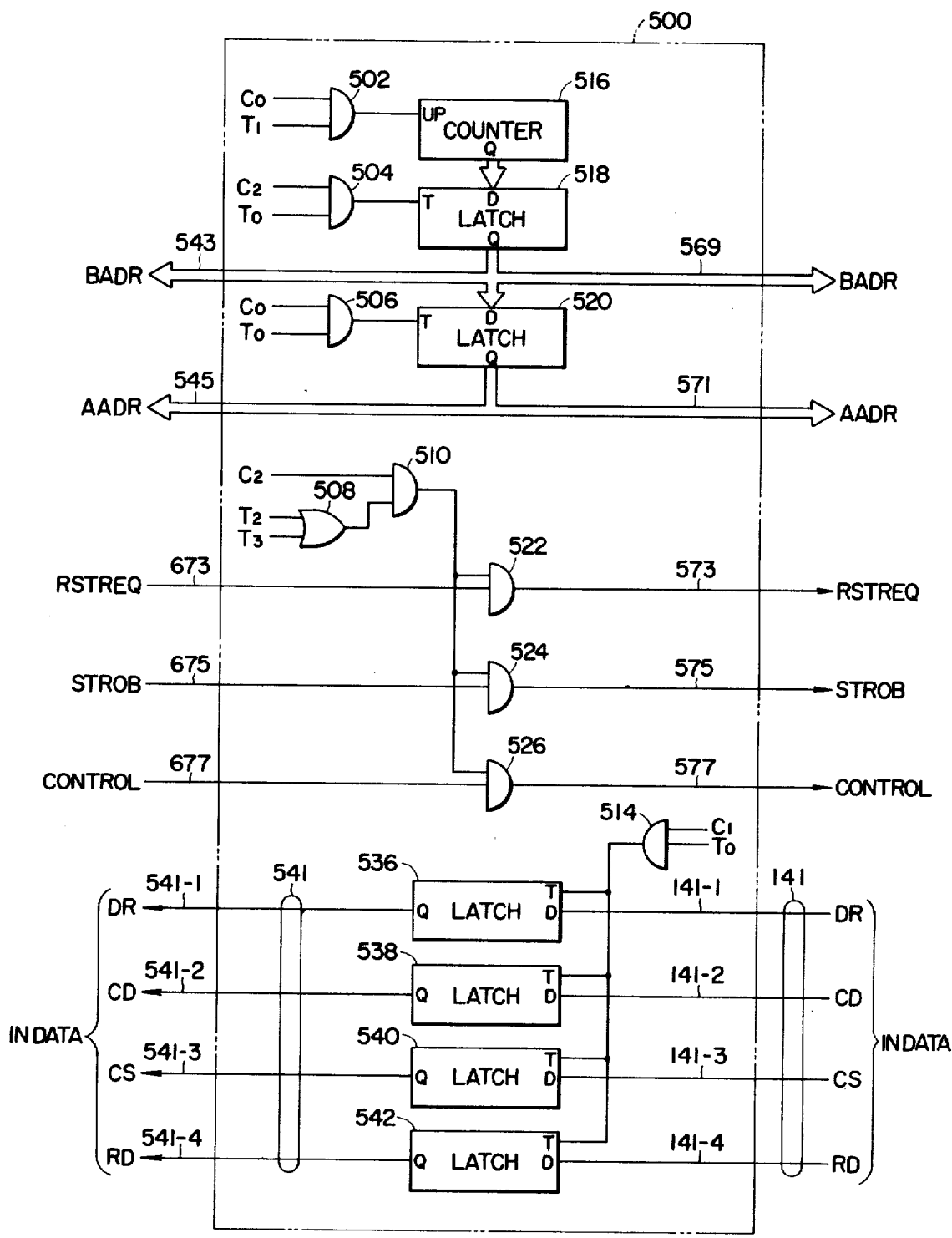
FIG. 3 is a logic circuit diagram of the communication scanning unit of this invention, used in the communication control unit of FIG. 1.

Referring to FIG. 3 in the communication scanning unit 500, the counter 516 is provided for generating a 3 bit address signal corresponding to 0 to 7, periodically, to scan the communication channels as well as to scan the line memory 900. The counter 516 counts up by one at the beginning of a period ($C_0$, $T_1$), when the signal applied to the trigger input (T) from an AND gate 502 becomes high because the AND gate 502 outputs a high level signal only when both clock signals $C_0$ and $T_1$ are at a high level. A latch 518 is a 3 bit latch which serves to store the address signal supplied to the data input (D) from the data output (Q) of the counter 516 at the beginning of a period ($C_2$, $T_0$), when the signal applied to the trigger input (T) from an AND gate 504 becomes high (the AND gate 504 outputs a high level signal only when both clock signals $C_2$ and $T_0$ are at high levels). Therefore the output of the latch 518 changes once per repetition period and 350 nsec after the counter 516 counts up by one. The output signal BADR of the latch 518 is an address signal and is sent from the data output (Q) to the decoder 120 of the line control unit 100 (FIG. 2) by way of a line 569 for selection of one of the communication channels. The address signal BADR is also sent to the memory control unit 800 by way of a line 543, where the address signal BADR is output during a period $C_0$ as an address signal ADR3, allowing the readout data to be used by the interface control unit 600.

The signal BADR is also applied to the signal input (D) of a latch 520, which stores the signal BADR at the beginning of a period ($C_0$, $T_0$), when a signal applied to the trigger input (T) from an AND gate 506 becomes high because the AND gate 506 outputs a high level signal only when both clock signals $C_0$ and $T_0$ are at high levels. Therefore the latch 520 outputs a 3 bit data signal corresponding to an address 0 to 7, periodically which changes once in an repetition period and 400 nsec after the latch 518 changes its output BADR. The signal AADR is also an address signal and is sent from its output (Q) to the decoder 13 of the line control unit 100 (FIG. 2) through the line 571 for selection of one of the communication channels. The signal AADR is also sent to CPU 700 and to the memory control unit 800 by way of a line 545 for reading or writing of the line memory 900. The address signal AADR sent to MCU 800 is compared with the address sent from the data processor 400 and also serves to generate address signal ADR3 during a period $C_3$, allowing the interface control unit 600 to write data with the address. The address signal AADR sent to CPU 700 is used to generate address signals ADR2, ADR2D, allowing CPU 700 to read or write the line memory 900 with the address ADR2 or ADR2D, respectively.

The generation of the two address signals BADR and AADR is important for the invention.

The AND gates 522, 524, 526 are provided to control the timing of transferring line adapter control signals RSTREQ, STROB, CONTROL on lines 673, 675, 677 to lines 573, 575, 577, respectively. These signals are sent from the interface control unit 600 to these gates to be transferred to the line control unit 100. These signals are generated in interface control unit 600 in response to signals which are sent from unit 100 to unit 600 when the modem for a scanned communication channel is ready to communicate with the communication control unit 300.

Latches 536, 538, 540, 542 are provided to store signals IN DATA supplied to their data inputs (D) from line control unit 100 by way of lines 141 at the beginning of a period ($C_1$, $T_0$), when a signal supplied to their trigger inputs (T) from an AND gate 514 changes to a high level because the AND gate 514 outputs a high level signal only when both clock signals $C_1$, $T_0$ are supplied. The outputs IN DATA are supplied from their data outputs (Q) to interface control unit 600 by way of lines 541. The meaning of the signal IN DATA will be explained later.

Referring to FIG. 2 again, the decoder 120 is provided to decode the address signal BADR on the line 569 which is sent from the latch 518 of communication scanning unit 500. In the present embodiments, full duplexed communication is realized in each pair of the line adapters 140, modems 200, and communication lines 260, with the result that the 1st and 2nd communication channels are realized in the first pair of elements including the line adapter 140, the modem 200 and the line 260, the 3rd and 4th communication channels are realized in the second pair, and so on. The decoder 120 selects one of the 4 pairs, depending on the signal BADR. Therefore, the decoder 120 outputs the decoded output signal to one of the lines 121 depending on the two bits of the most significant and the second most significant bits of the 3 bits of the signal BADR. Of course it is possible to modify the lines 569 so as not to send the least significant bit of the address BADR to the decoder 120. It is to be noted that the decoded output signal appears considerably after the address signal BADR is renewed in the latch 518 (FIG. 3). The time delay is due to the signal propagation time through the line 569, which is about 250 nsec for 50 meter of the line. Furthermore, it should be understood that the decoder output signal changes only after the address signal BADR is renewed twice. For example, the decoder output signal does not change even when the signal BADR changes from "000" to "001", during which the first pair of the line adapters 140, the modems 200 and the communication lines 260 remains to be selected. As a result one pair remains to be selected during two scanning periods (1600 nsec).

The decoder 130, which is important in this invention, is provided to decode the address signal AADR on the line 571 which is sent from the latch 520 communication scanning unit 500. As the decoder 120, the decoder 130 selects one of the four pairs of the line adapters 140, the modems 200 and the communication lines 260. Therefore the decoder 130 outputs the decoder output signal on one of the lines 131, depending on the most significant and the second most significant bits of the 3 bits of the signal AADR with the result that the decoder 130 outputs different signals only after the address signal AADR is renewed twice. It is further to be noted that the address signal AADR reaches the decoder 130, 400 nsec after the address signal BADR representing the same address as the signal AADR has reached the decoder 120, because the address signal AADR is renewed in the latch 520, 400 nsec after the address signal BADR has been renewed in the latch 518. Therefore, the decoder 130 begins to select one of the four pairs of the line adapters 140, modems 200 and the line 200, 400 nsec after the decoder 120 has begun to select the same pair and continues to select the same pair until 400 nsec after the decoder 120 begins to select the next pair. How these two decoder outputs are used in line control unit 100 will be explained later on. It is to be noted further that it is possible to modify the lines 571 so as not to send the least significant bit of the address signal AADR to the decoder 130.

A line 143 is provided to send a signal SREQ to communication control unit 300 which signal is provided when the selected communication channel is ready to receive data from the unit 300.

A line 141 is provided to send a signal INDATA to unit 300 from the selected line adapters. The signal INDATA includes modem monitor data which shows the operating state of the modems, as well as received data. A line 145 is provided to send a signal RREQ to unit 300, which signal is provided when the selected communication channel is ready to send data to unit 300. A line 679 is provided to send a signal OUTDATA from unit 300 to the selected line adapter 140. The signal OUTDATA includes data to send to the communication lines and modem control signals. The signal OUTDATA is sent to the modems 200 through lines 179. Lines 573, 575 and 577 are provided for sending signals RSTREQ, STROB and CONTROL to the selected line adapter from unit 300. The signal RSTREQ is provided to enable the line adapter which is sending the signal RREQ to stop sending the signal. The signal RSTREQ is sent from unit 300 when the signal RREQ from the selected line adapter has reached unit 300.

The signal STROB serves to enable the line adapter which is sending the signal SREQ to receive sending data from the signal OUTDATA on the line 579. The signal CONTROL is provided to enable the line adapter which is sending the signal SREQ to receive the modem control data from the signal OUTDATA on the line 579. These signals STROB or CONTROL are also used to make the line adapter which is sending the signal SREQ stop sending the signal.

Figure 4:
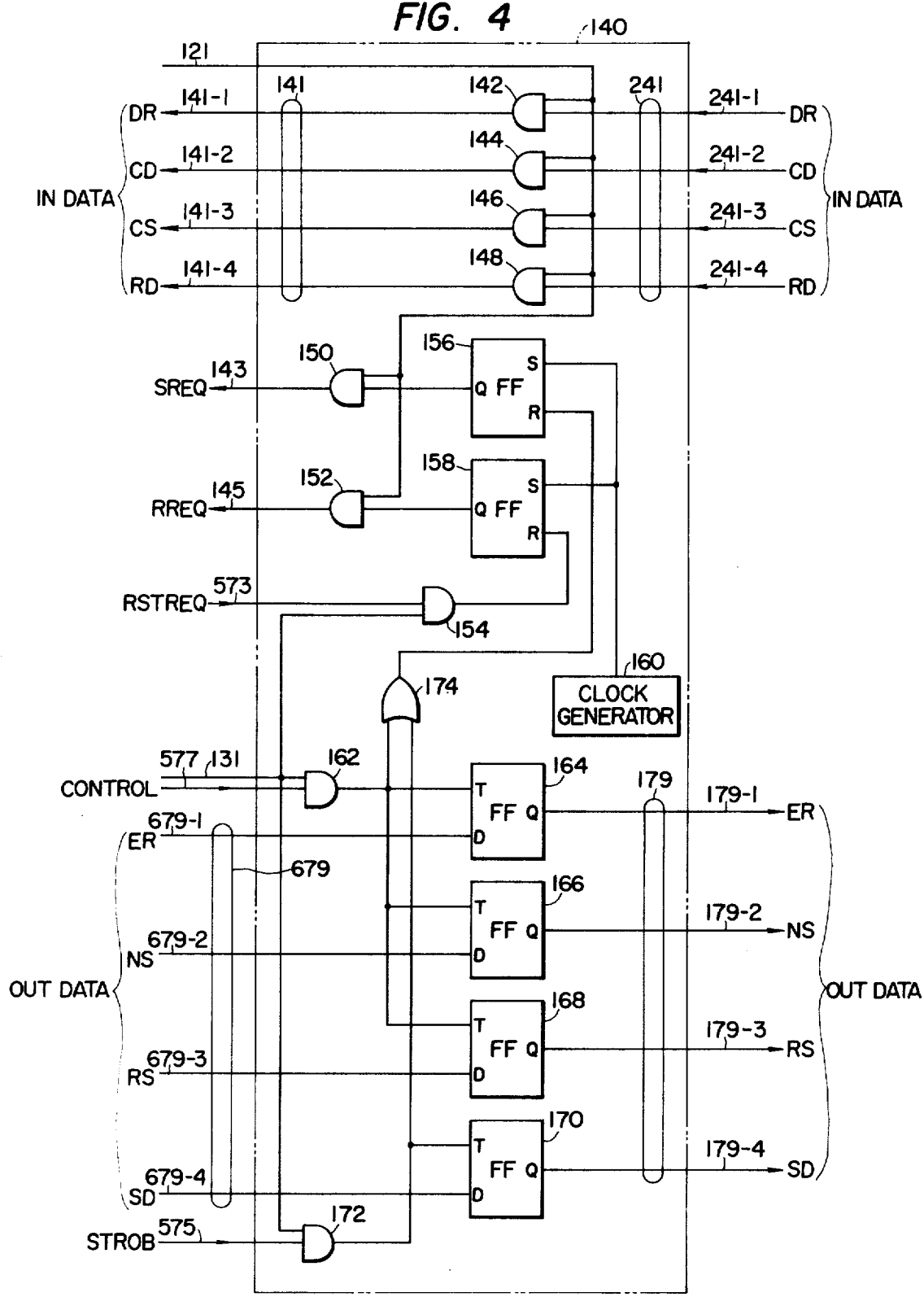
FIG. 4 is a logic circuit diagram of the line adaptor of this invention used in the line control unit of FIG. 2.

In FIG. 4 is shown a detailed logic circuit diagram of the line adapter 140 of this invention.

The AND gates 142, 144, 146 and 148 are provided to transfer the signal INDATA on the lines 241 to the lines 141 only when the decoder output signal of the decoder 120 is given on the line 121. From the lines 241-1, 241-2, 241-3, and 241-4 to the lines 141-1, 141-2, 141-3, and 141-4 the signals DR, CD, CS and RD, which are termed INDATA, are transferred by these gates.

The signal on the lines 141-1 and 541-1, designated as DR, represents a "data set ready" signal. The signal on the lines 141-2 and 541-2, designated as CD, represents a "data channel received line signal detector" signal. The signal on the lines 141-3 and 541-3, designated as CS, represents a "ready for sending" signal. These signals are provided to monitor the states of each modem. These signals are for CCITT interfaces already used in the prior art. Some other monitor data signals can be added, if necessary. The signal on the lines 141-4 and 541-4, designated as DR, represents one bit of received data.

The R-S type flip-flops 156 and 158 are provided for sending the signal SREQ and RREQ, respectively. The signal from the output (A) of the flip-flop 158 is sent to an AND gate 152. The AND gate 152 is provided to control sending the signal RREQ from the line adapter 140 to the line 145. The AND gate is enabled by the decoder output signal from the decoder 120 on the line 121. The signal RREQ can be sent only from a line adapter which is selected by the decoder 120.

The signal from the output (Q) of the flip-flop 156 is sent to an AND gate 150. The AND gate 150 is provided to control sending the signal SREQ from the line adapter 140 to the line 143. The AND gate 150 is enabled by the decoder output signal from the decoder 120 on the line 121. The signal SREQ can be sent only from a line adapter which is selected by the decoder 120.

The flip-flops 156, 158 are set by an input to their set terminals (S) from a clock generator 160. The clock generator 160 is provided for generating a high frequency clock signal whose frequency is equal to the data transfer frequency of the communication channels, which is now supposed to be 96 KHz. The clock generator 160 generates the clock signal in synchronism with the operation of the modems 200 and signal lines for synchronizing the clock generator 160; however, the modem 200 are not shown in the figures. The flip-flop 158 is reset when the signal RSTREQ on the line 573 is applied to a reset terminal (R) through an AND gate 154. The AND gate 154 is enabled when the decoder output signal is given on the line 131 from the decoder 130.

The flip-flop 156 is reset when the signal CONTROL or STROB is applied to its reset terminal (R) through an AND gate 162 or 172 and an OR gate 174, respectively. The AND gates 162 and 172 are enabled when the decoder output signal from the decoder 130 is given on line 131.

Flip-flops 164, 166, 168 are provided to store signals ER, NS, RS applied to their inputs (D) by way of lines 579-1, 579-2, 579-3 when the signal CONTROL is applied to their trigger terminals (T) through the AND gate 162.

A flip-flop 170 is provided to store a signal SD applied to its input (D) by way of a line 679-4 when the signal STROB is applied to its trigger terminal (T) through an AND gate 172. The AND gate 172 is enabled when the decoder output signal from the decoder 130 is given on the line 131.

These signals EN, NS, RS, SD which are termed OUTDATA are sent from unit 600 of unit 300. The signals are provided to be sent from the line adapter 140 to the corresponding modem by way of lines 179-1, 179-2, 179-3, and 179-4. The signals ER, NS, and RS represent "connect data set to line", "data terminal ready", and "request to send" signals, respectively.

These signals are supplied to control modems 200. These are for CCITT interfaces already used in the prior art. The signal SD represents a sending data.

Figure 11:
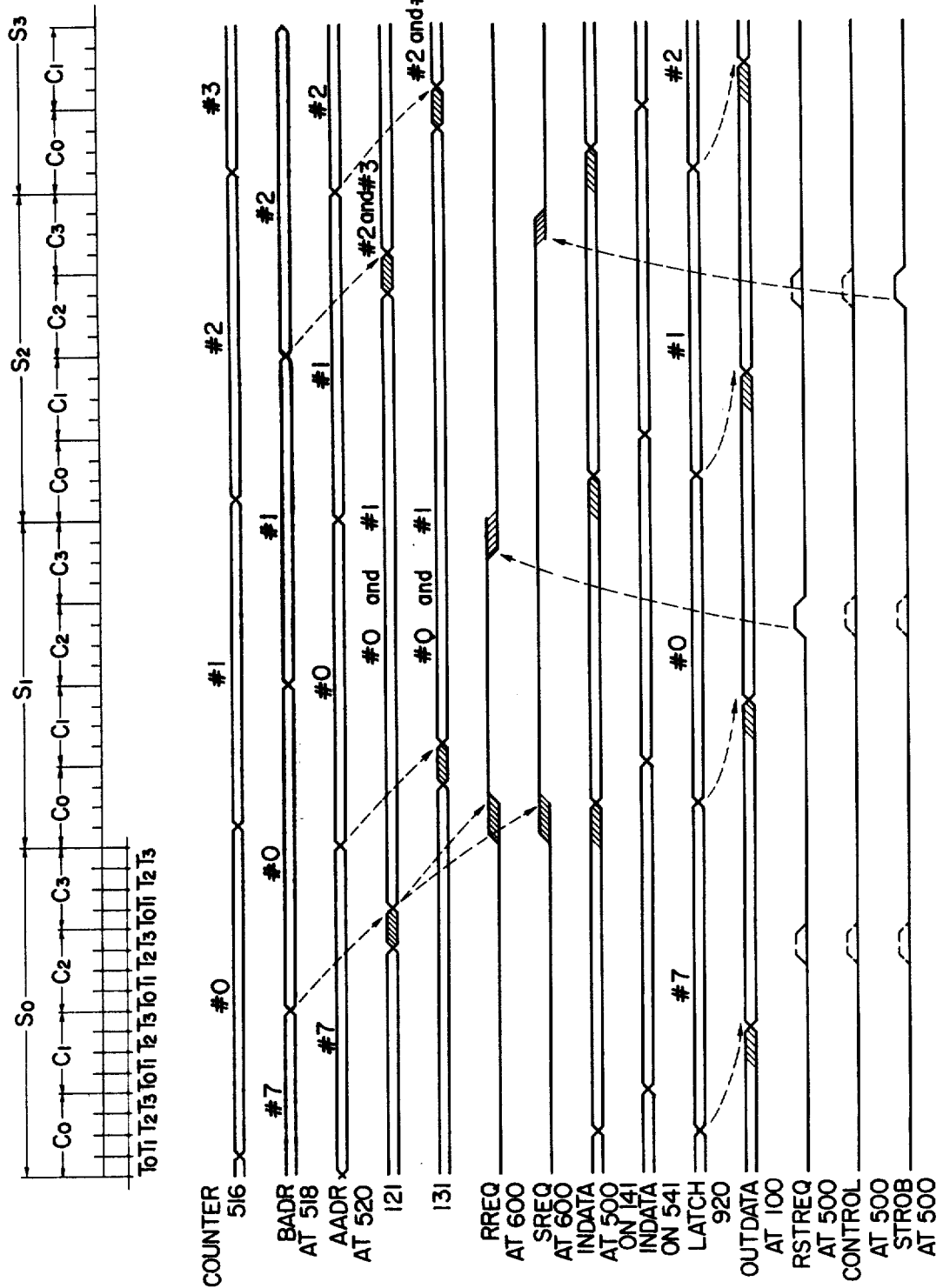
FIG. 11 is another signal level transition diagram at various locations in the communication control unit of FIG. 1 and the line control unit of FIG. 2 related to its operation of controlling data transfer between the line control unit and the communication control unit.

Signal level transitions at various points related to the communication between line control unit 100 and unit 300 are shown in FIG. 11, where the numerals on the signals represent the address number of the corresponding communication channel selected at each time and the hatched regions represent transient regions where the signal transitions have not been finished.

The manner in which line control unit 100 communications with unit 300 will be explained, referring to FIG. 11. The first line adapter 140, when selected by the output of the decoder 120, due to the address signal BADR equal to #0, can send the signal SREQ or RREQ as well as the INDATA to communication control unit 300 from the period ($S_0$, $C_3$, $T_1$). The unit 300, receiving the signal SREQ or RREQ at the period ($S_1$, $C_0$, $T_2$) selects one of the two signals depending on the command data read out of the line memory 900. When unit 300 chooses the signal RREQ, it sends back the signal RSTREQ at the periods ($S_1$, $C_2$, $T_2$) and ($S_1$, $C_2T_3$) by way of the line 573, which helps, at the end of the period $S_1$, to reset the flip-flop 158 of the first line adapter which has sent the signal RREQ. In the present embodiments the flip-flop 158 is reset about 900 nsec later after the signal RREQ has been output from the selected line adapter 140. The time span 900 nsec is determined by the propagation delay times of the signal RREQ from unit 100 to unit 600 and the signal RSTREQ from unit 600 to unit 100 as well as the data processing time in unit 600 and unit 500. The time span 900 nsec is longer than the scan period 800 nsec, the address signal BADR having already changed to #1 and the decoder 120 selecting the same first line adapter corresponding to #1 communication channel when the signal RSTREQ has reached unit 100. Meanwhile, the address signal AADR still keeps the same address (#0) as the address of the communication channel (#0) which has sent the signal RREQ because the address signal AADR changes 400 nsec later after the signal BADR changes. Therefore, when line control unit 100 receives the signal RSTREQ at the end of the period $S_1$, the decoder 130 enables the AND gate 154 of the first line adapter which sent the signal RREQ. During these operations, the signal INDATA is also sent to communication control unit 300 by way of the line 141 from the first line adapter, which signal is written in the line memory 900 by virtue of unit 300.

Thus, one cycle of operations for the #0 communication channel composed of the first line adapter 140, the first modem 200 and the first communication line 260 are finished.

As the signal SREQ is not received by unit 300 at the period ($S_1$, $C_0$, $T_2$), where the signal RREQ is received, the flip-flop 156 remains set. Therefore, the signal SREQ continues to be applied to unit 300.

If unit 300 chooses the signal SREQ in the next scanning period, unit 300 sends the signal STROB or CONTROL during the periods ($S_1$, $C_2$, $T_2$) and ($S_2$, $C_2$, $T_3$), which signal reaches line control unit 100 at the end of the period $S_2$, when the address signal BADR represents #2, selecting the second line adapter 140.

On the other hand the address signal AADR represents #1, still selecting the first line adapter. When the signal CONTROL is sent back to time control unit 100, the AND gate 162 of the first line adapter which has sent the signal SREQ is enabled by the output signal on the line 131 supplied from the decoder 130. The first line adapter 140, whose AND gate 162 has been enabled by the decoder 130, stores the signals ER, NS, RS of the data OUTDATA on the lines 679 in its flip-flops 164, 166, 168 and outputs them to the modem 200 by way of the lines 179. The signal CONTROL is also supplied to the flip-flop 156 by way of the OR gate 174, to reset the flip-flop. When the signal STROB is sent back to unit 100, the AND gate 172 of the first line adapter 140 which has sent the signal SREQ is enabled by the signal on the line 131 supplied from the decoder 130. The first line adapter, whose AND gate 172 has been enabled by the decoder 130, stores the signal SD on the line 679-4 in the flip-flop 170, which signal is again sent to the modem 200 by way of the line 179-4. The signal STROB is also supplied to the flip-flop 156 of the same line adapter 140 by way of the OR gate 174, to reset the flip-flop. The reset flip-flops 156, 158 are set again when the clock generator 160 generates a set signal. Thus, another cycle of operation of the selected line adapter is finished.

Data as shown in FIG. 9($a$) is stored in the line memory 900, corresponding to each of the communication channels, 8 in all in this embodiment. The stored data comprises one field of a one bit synchronous pattern detecting flag data (SF), one field of a 8 bit communication data (AB), that is, received data or sending data, 3 fields of a one bit modem monitor data such as DR, CD and CS, 3 fields of a one bit modem control data such as ER, NS and RS, one field of a 3 bit shift count data (BCT) which show the shift number of the data AB, one field of a 2 bit command data (CMD) and one field of a 2 bit status data (ST). The decoder SF is provided to show that a synchronous pattern have been detected from the received data. This data SF is used when the interface control unit 600 receives data from the modems.

In the field of data AB, sending data or received data are stored. When the data processor is to send data to one of the communication lines, the data processor sends 8 bits of the data at a time to CPU 700, which stores the data in the field A-B. These sending data are read out from the memory by interface control unit 600 and one bit of the 8 bits of data are selected in unit 600 to be sent to line control unit 100, the remaing bits being shifted by one bit to be stored in the line memory 900 again. The same procedure is repeated periodically, until all of the data AB have been sent out.

The shift count data BCT represents the shift number which is equal to the bit number of already sent data during this procedure. If 8 bits of data have been sent from the line memory 900, unit 600 sends a signal PREQ to CPU 700, which now interrupts the data processor 400 and requests it to send another 8 bits of data.

In the field of data AB for receiving channels, received data are stored. One bit of the data is sent from modems to interface control unit 600 in a repetition period. The unit 600 stores the one bit in the AB field of the memory. In the next repetition period, unit 600, reading out the line memory, shifts the stored bit to next bit position and stores the new received bit in the original bit position. Repeating these operations unit 600 stores 8 bits of data into the line memory. In this case the shift count data BCT represents the shift number which is equal to the bit number of already received data during the these procedures.

The data CMD, which are given by the data processor 400, are provided to command unit 600 to perform signal processings corresponding to the command data. The signal processings which unit 600 is to perform are tabled in FIG. 9(b). If the data CMD are equal to "00", unit 600 performs signal processings to monitor modems, that is, unit 600, receiving data signals DR, CD and CS sends them to a related modem and also sends to CPU 700 a signal PREQ to inform it that those data have been sent to the modem.

If the data CMD are equal to "01", unit 600 performs signal processings to control the modems. That is, unit 600, receiving data signals ER, NS, RS from the line memory 900, sends them to a related modem by way of the line adapters 140 and sends to CPU 700 a signal PREQ to inform it that those data have been sent to the modem.

If the data CMD are equal to "10", unit 600 performs signal processing to send sending data to a related modem. That is, unit 600, receiving one bit of the data AB from the line memory 900, sends it to the modem as a signal SD by way of the line 679 and the line adapters 140.

If the data CMD are equal to "11", unit 600 performs signal processing to receive data from a communication line. That is, unit 600, receiving data from the related modem, writes them in the line memory 900.

The status data ST are provided to show a state of data processing for a communication channel, as shown in FIG. 9(c). If the data ST are 00, the corresponding channel is in a inactive state, that is, data processing for the channel is neither continuing nor finished in CPU 700 and unit 600. If the data ST are 01, the corresponding channel is in an operating state, that is, unit 600 is communicating with the modem.

If the data ST are 10, the corresponding channel is in an finished state, that is, unit 600 has completed communication with the corresponding modem and CPU 700 is processing the data for the modem.

These data ST are changed both in unit 600 and in CPU 700 in accordance with completion of processing in each unit.

Figure 5:
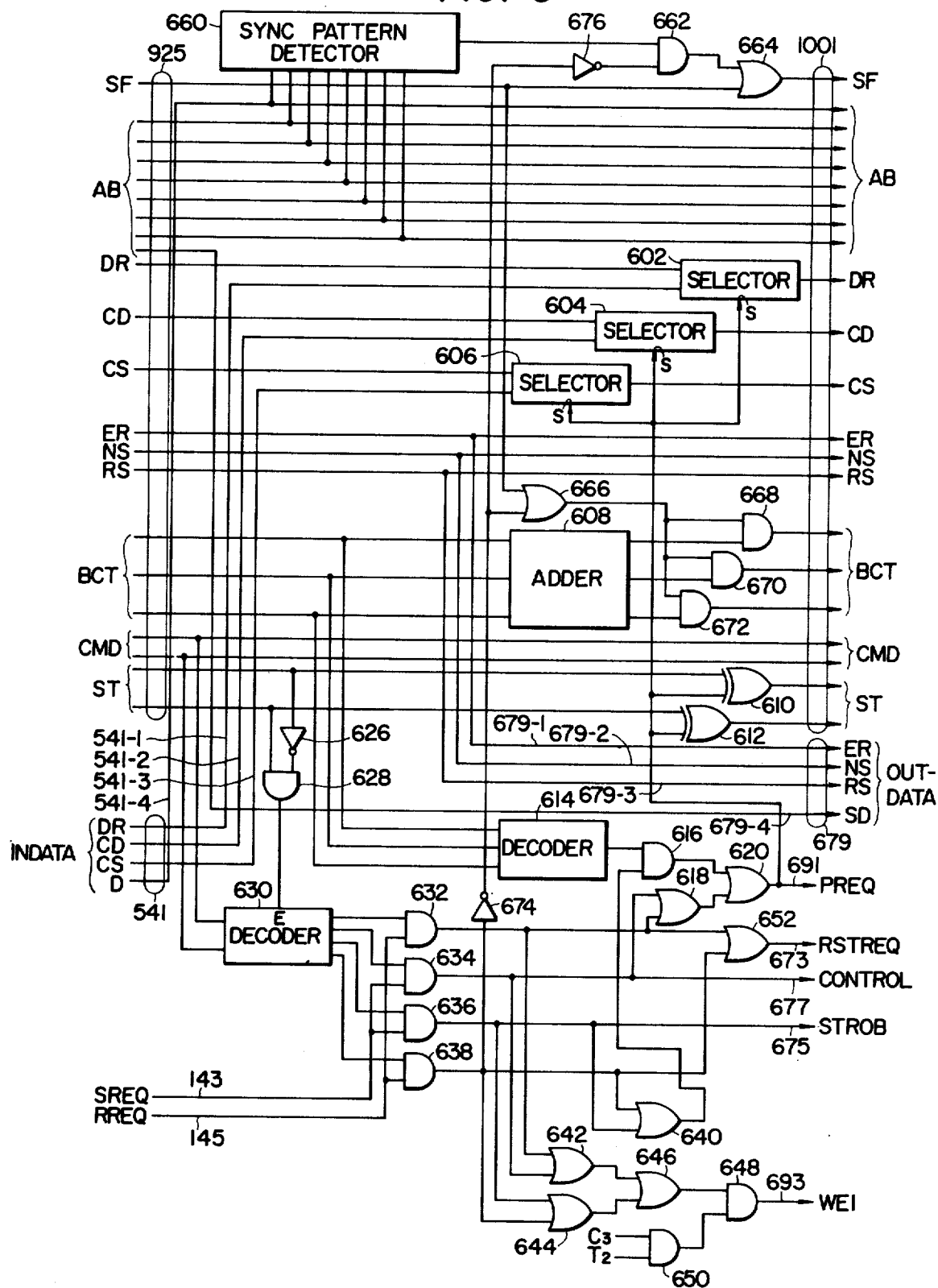
FIG. 5 is a logic circuit diagram of the interface control unit of this invention used in the communication control unit of FIG. 1.

Referring to FIG. 5, unit 600 comprises a decoder 630 which decodes the two bit data CMD only when an enabling signal is applied to its enable signal input (E). An AND gate 628 and an inverter 626 is provided to generate the enabling signal to the decoder 630 only when the two bit data ST are equal to "01", with a low level signal on the line connected to the invertor 626 and a high level signal on the other line for the data ST. It is to be noted that when the data ST are "01", the corresponding communication channel is operating, that is, unit 600 has not finished communication with the corresponding channel. The data CMD and ST are supplied from a latch 920 (FIG. 1) by way of a line 925. The decoder 630 outputs a high level signal selectively to one of AND gates 632, 634, 636 and 638, when the data CMD is 00, 01, 10 and 11, respectively, under the condition that the data ST are "01". To the AND gates 632 and 638, the signal RREQ is input from line control unit 100 by way of the line 145. To the AND gates 634 and 636, the signal SREQ is input from unit 100 by way of the line 143. The high level outputs from the AND gates 632 and 638 are sent through an OR gate 652 to a line 673. The signal RSTREQ on the line 673 is sent back to unit 100 as an answering signal to the signal RREQ. The high level output of the AND gate 634 is sent back to line control unit 100 by way of a line 677 as an answering signal (CONTROL) to the signal SREQ. The high level output of the AND gate 636 is sent back to line control unit 100 by way of a line 675 as another answering signal (STROB) to the signal SREQ. The outputs of the gates 632, 634 or the outputs of the gates 636, 638 are input to an AND gate 648 by way of OR gates 642, 646 or OR gates 644, 646, respectively. The AND gate 648 is enabled at the beginning of the period ($C_3$, $T_2$), when a high level signal is supplied from an AND gate 650 by the clock signals inputs $C_3$, $T_2$. The high level output of the AND gate 648 is a write enable signal WE1, which is sent to memory control unit 800, requiring it to write data on a bus 1001 to the line memory 900. The data on the bus 1001 are sent to the line memory 900 by way of a bus 1005 (FIG. 1). It should be noted that the signal WE1 is output once in a scanning period as far as the data ST is "01" and the signals SREQ, RREQ are supplied, no matter what the data CMD is. The high level outputs of the AND gates 632, 634 is sent to CPU 700 as a signal PREQ, by way of OR gates 618, 620 and a line 691. The signal PREQ is output to inform CPU 700 that unit 600 has received modem monitor data which the data processor 400 demanded or that unit 600 has sent modem control data to a modem which the data processor supplied. Thus, the decoder 630 and the related gates are used to supply various control signals. Each bit of the data AB on the lines 925 except the 8-th bit is output to the next bit position of the lines for new data AB of the lines 1001 and the received signal RD on the line 541 is output to the first bit position of the data AB on the lines 1001, thus unit 600 forming new 8 bit of data on the lines 1001. This operation means that the data on the lines 925 is shifted by one bit and a new bit of data RD is supplied as an first bit of data. Repeating this operation unit 600 can store in the line memory 900 8 bits of received data RD which are sent from a modem by one bit in a scanning period. The 8-bit of the data AB on the line 925 is output as a sending signal SD to the line 679-4. Repeating the operation of sending the 8-th bit of the data AB and shifting the other bits as mentioned above, unit 600 can send the 8 bits of data AB stored in the line memory 900 by one bit in a scanning period. A synchronous pattern decoder 660 is provided to detect a synchronous pattern from the data AB and is used when unit 600 receives received data signal RD from modems. Usually received data are preceded by a synchronous bit pattern, by which unit 600 detects that the bit following the synchronous bits is the first bit of the following plurality of bits to be received. The synchronous pattern is a 8 bit pattern determined beforehand. Many kinds of such pattern are used in the prior art, one of which is a pattern of "00010110". The synchronous pattern detector 660 receives the data AB with the received data at its first bit position and compares the data AB with the predetermined synchronous pattern. When coincidence is detected, the synchronous pattern detector outputs a high level signal to an AND gate 662. The AND gate 662 is enabled only when a high level signal is applied to it by the AND gate 638 by way of two invertors 674, 676. Therefore the AND gate 662 is enabled only when the data CMD is "11" and the signal RREQ is input to the AND gate 638. The enabled AND gate 662 outputs a high level signal on the line for the data SF of the lines 1001 by way of an OR gate 664, with a result that the data SF is set to 1. When the coincidence is not detected, the data SF on the lines 1001 is 0. Once the coincidence is detected the data SF remains at 1 during one series receiving operation because the data SF is stored in the line memory 900 and, when read out from the memory to the line 925, the data SF on the lines 925 pass through the OR gate 664 to the lines 1001. The received data when the data SF is 0, is of no use except for the purpose of detecting the synchronous pattern. The adder 608 is provided to count the number of bits of the data already sent from unit 600 or the data already received by unit 600. The adder 608 adds one to the count data BCT whenever unit 600 has received one bit of the received data RD or unit 600 has sent one bit of the sending data. The inverter 674, an OR gate 666, AND gates 668, 670, 672 are provided to clear the output of the adder 608, when no synchronous pattern is detected in receiving data RD.

When the signal RREQ is input to the AND gate 638 and the data CMD are "11", the AND gate 638 outputs a high level signal to the invertor 674, which now outputs a low level signal. Under these conditions, when the data SF is 0, the OR gate 666 outputs a low level signal, inhibiting the AND gates 668, 670, 672. Therefore the data BCT on the lines 1001 are cleared, which means the received data from a modem is not received yet. Otherwise, the AND gates 668, 670, 672 are enabled, passing through the outputs of the adder 608 to the lines 1001 as the count data BCT. The interface control unit 600 further comprises a decoder 614, which outputs a high level signal only when the decoder input of the data BCT on the lines 925 are equal to 7, which means that the 8th bit is now being sent or being received by unit 600. The high level output of the decoder 614 is sent to the line 691 as a signal PREQ by way of an AND gate 616 and the OR gate 620. The AND gate 616 is enabled only when a high level signal is input from the AND gates 636, 638 by way of an OR gate 640, that is only when unit 600 is now receiving or sending data. The signal PREQ is sent to CPU 700 and is used to inform it that 8 bits of data have been sent or received. The modem control data such as ER, NS, RS are sent to the lines 679-1, 679-2, 679-3, to form OUT-DATA with the data SD on the line 679-4. The modem monitor data DR, CD, CS on the lines 541 and those on the line 925 are selectively output to the lines 1001 as new data DR, CD, CS, by virtue of selectors 602, 604, 606, respectively, depending on whether the high level signal PREQ is supplied to the inputs (S) of these selectors.

Exclusive-OR gates 610, 612 are provided to change the data ST on the lines 925 when the signal PREQ is applied to one of two inputs of each gate. The signal PREQ is output only when the data signals ST on the lines 925 are "01", because otherwise the decoder 630 is not enabled. When the data signal on the lines 925 is "01" and the signal PREQ is output from the OR gate 620, the exclusive-OR gates change the data signal ST from "01" to "10" and output the new data ST on the lines 1001. If the data ST on the lines 925 is not "01", the exclusive-OR gates 610, 612 output on the lines 1001 the same data signals as the data signals on the lines 925. The new data ST, when set to "10", is used to inform CPU 700 that the operation of unit 600 for the communication channel is finished.

Figure 12:
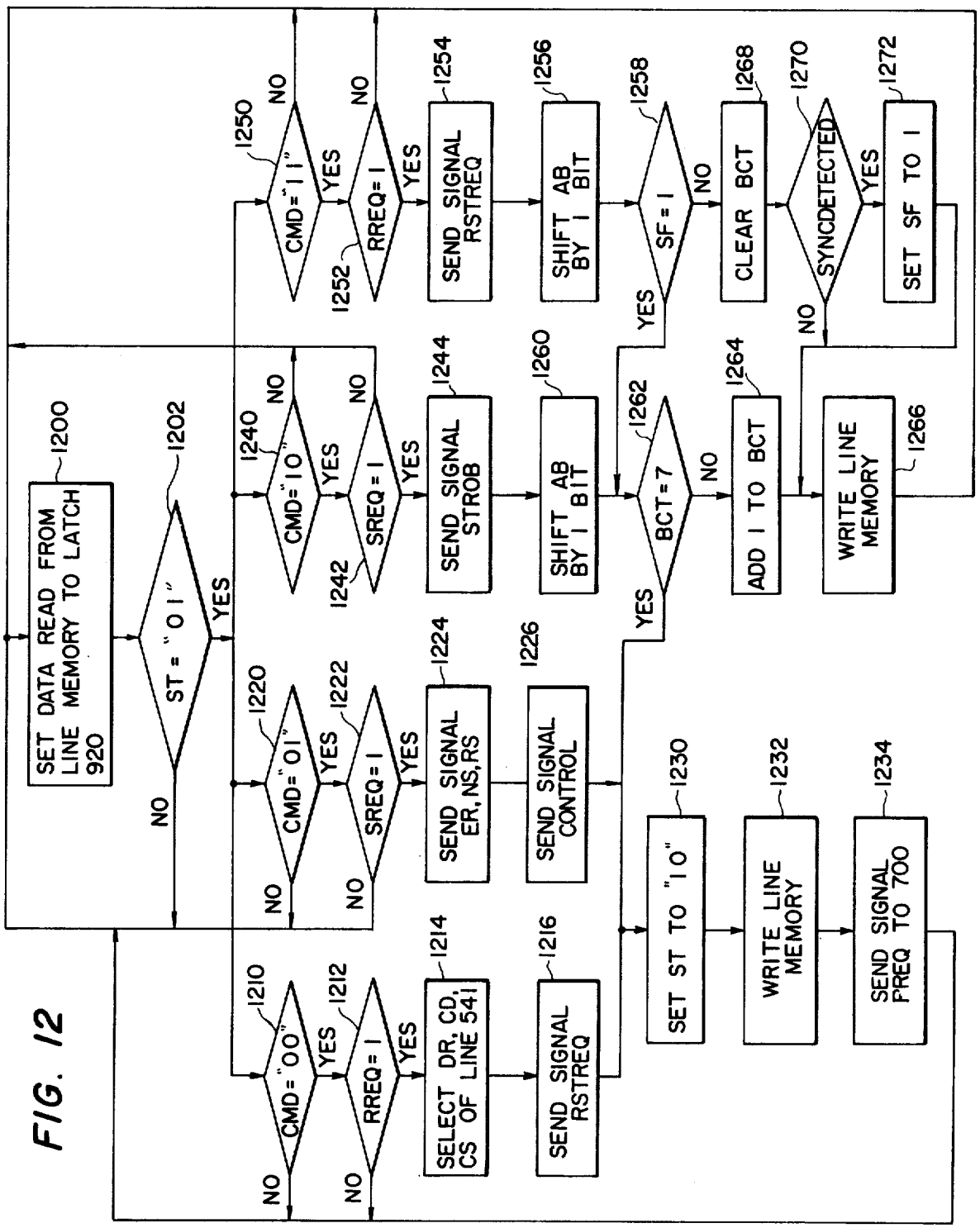
FIG. 12 is a flow chart illustrating the function of the interface control unit of FIG. 5 when handling data read from the line memory.
Figure 13:
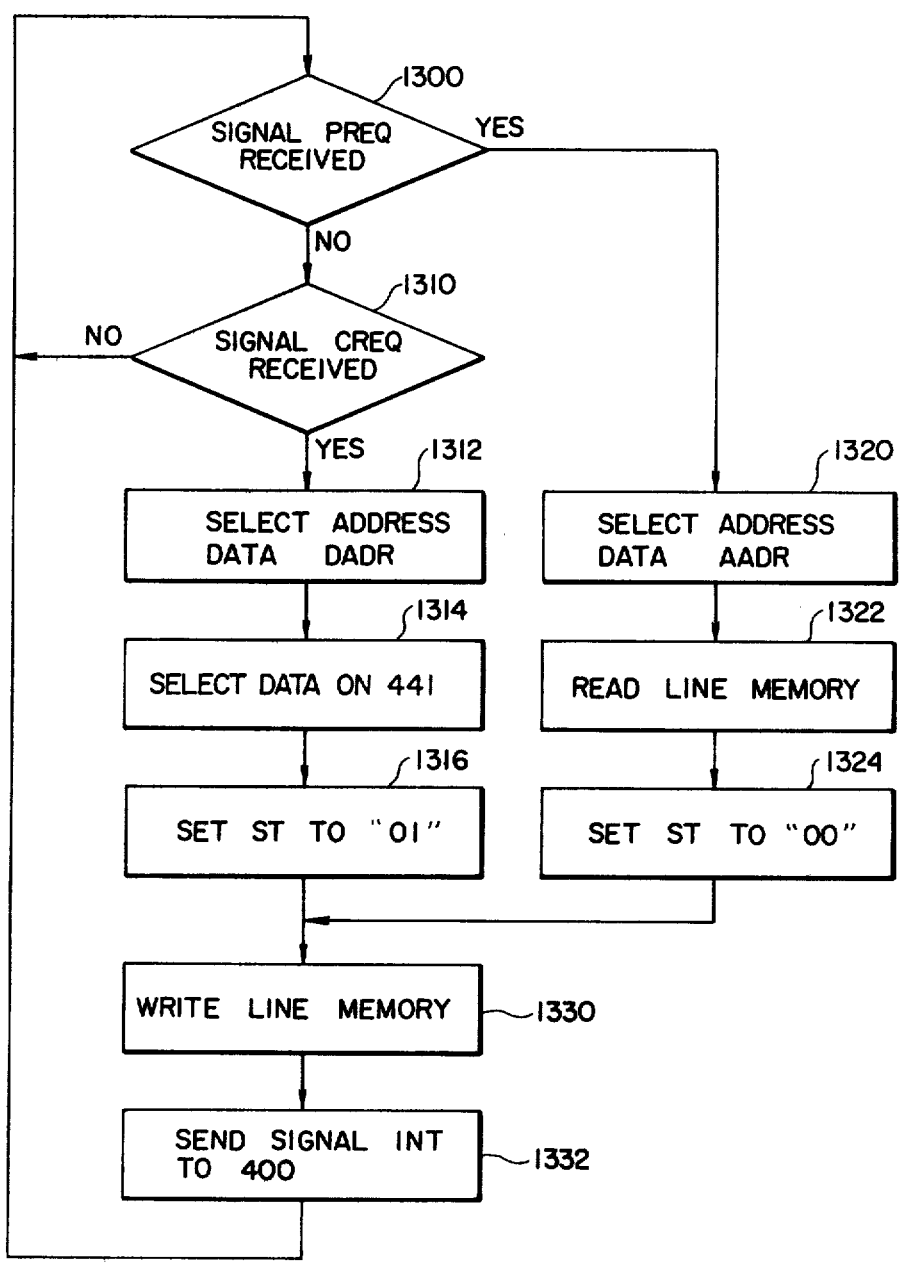
FIG. 13 is a flow chart illustrating the function of the central processing unit of FIG. 6 when handling data sent from the line adapter.

From the foregoing explanation it is seen that the interface control unit 600 conducts various operations depending on the command data CMD and status data ST. These operation are illustrated in the flow chart of FIG. 12. The unit 600 procedes at the beginning of the period ($C_0$, $T_2$) to a set data read from line memory 900 to latch 920 for operation 1200. Though the latch 920 is illustrated outside of unit 600 in FIG. 1, the above operation is regarded as one of the operations of unit 600. The address to the line memory 900 is equal to the address BADR because memory control unit 800 selects the address BADR at this time. The data stored in the latch 920 is sent to unit 600 by way of the lines 925. The unit 600 then proceeds to a ST="01" test operation at 1202. If the data ST are not equal to "01", the AND gate 628 is not enabled, disabling the decoder 630. When the data ST is not equal to "01", it means that unit 600 is not in a state communicating with the communication channel whose data is stored in the latch 920. Therefore, unit 600 does not need to conduct any significant operations in this case. As a matter of fact, unit 600 of FIG. 5 conducts useless operations. If the data ST is equal to "01", the AND gate 628 is enabled, enabling the decoder 630 and allowing unit 600 to proceed to CMD test operations 1210, 1220, 1240 and 1250.

If the data CMD is equal to "00", the decoder 630 outputs a high level signal to the AND gate 632, allowing unit 600 to proceed to a RREQ=1 test at operation 1212. If the signal RREQ is not received, the AND gate 632 is prohibited, with the result that unit 600 conducts useless operations. If the signal RREQ is received, the AND gate 632 is enabled, inputting a high level signal to the selector inputs (S) of the selectors 602, 604, 606 by way of the OR gates 618, 620, and allowing unit 600 to proceed to select DR, CD, CS of line 541 at operation 1214. The enabled AND gate 632 also sends a high level output to the line 673 by way of the OR gate 652, proceeding to a send signal RSTREQ operation at 1216. The signal RSTREQ is sent to the corresponding line adapter. The unit 600 now proceeds to a set to ST "10" operation 1230, which is to show that unit 600 has finished the communication with the corresponding communication channel. The received data DR, CD, CS and the data ST are now written in the line memory during a write line memory operation 1232. The write enable signal WE1 is generated at the period ($C_3$, $T_2$) because a high level signal is input to the AND gate 648 by way of the OR gates 642, 646, which AND gate 648 is enabled when two clock signals $C_3$, $T_2$ are supplied.

The address signal ADR3 is equal to AADR because memory control unit 800 selects the address signal at this moment. After the operation 1232, unit 600 proceeds to a send signal PREQ to 700 operation at 1234, during which the AND gate 632 outputs a high level signal PREQ on the line 691 by way of OR gates 618, 620 which signal is sent to CPU 700 to inform that unit 600 has finished its operation for the selected communication channel. Thus, unit 600 finishes its operation for receiving modem monitor data DR, CD, CS.

If the data CMD is identified as "01" after a CMD="0.1" test operation at 1220, the decoder 630 outputs a high level signal to the AND gate 634. After the test operation at 1220, ICU proceeds to a SREQ=1 test operation. If the signal SREQ is received during its operation, unit 600 proceeds to a send signal ER, NS, RS operation at 1224, proceeding further to a send signal CONTROL operation at 1226. Under the conditions that the data CMD is equal to "01" and that the signal SREQ is received, AND gate 634 outputs a high level signal on the line 677 to be sent to the selected line adapter. After these operations unit 600 proceeds to the same operation at 1230, 1232, 1234 as are conducted when the data CMD is equal to "00". Thus unit 600 finishes its operation for sending modem control data ER, NS, RS.

If the data CMD is identified as "10", after the test operation at 1240, the decoder 630 outputs a high level signal to the AND gate 636, allowing unit 600 to proceed to a test operation at 1242. If the signal SREQ is received, the AND gate 634 is enabled, allowing unit 600 to proceed to a send signal STROB operation at 1244. During this operation, the high level signal STROB on the line 675 is sent to the selected line adapter, requiring it to receive sending data sent during a shift AB by 1 bit at operation 1260.

During this operation, the 8-th bit of data AB is sent to the selected line adapter by way of the line 679-4 and the remaining bits are output on the lines 1001 after one bit shift.

After this operation, the value of BCT is checked during a BCT=7 test operation at 1262. If the value BCT is not equal to 7, the decoder 614 does not output a high level signal, allowing unit 600 to proceed to an add 1 to BCT operation 1264, during which the BCT data on the lines 925 is incremented by 1 by virtue of the adder 608. The new BCT data is sent to the lines 1001 because the AND gates 668, 670, 672 are enabled by virtue of a high level input. The data ST on the lines 925 is sent to the lines 1001 without any change because the output of the OR gate 620 is low. After these operation, the data on the lines 1001 is written during a write line memory operation 1266. Thus, unit 600 finishes its operations for sending one bit of data AB. The unit 600, to finish its operations for sending 8 bits of data AB, repeats these operations. When the data BCT is identified as 7 during the test operation 1262, unit 600 proceeds to the operations 1230, 1232, 1234. Thus, unit 600 finishes its operation for sending 8 bits of data AB.

If the data CMD is identified as "11" during a CMD="11" test operation at 1250, the decoder 630 outputs a high level signal to the AND gate 638, enabling unit 600 to proceed to a RREQ=1 test operation at 1252. If the signal RREQ is received, the AND gate 638 is enabled, which allows unit 600 to proceed to a send signal RSTREQ operation at 1254. During this operation the received data RD is output to the first bit position of the data AB on the lines 1001 and the first to 7th bits of data AB on the lines 925 is output to the 2nd to 8th bit position of the data AB on the lines 1001. Thus the data RD is received by unit 600. After this operation the data SF is checked during a SF=1 test operation at 1258, in order to know whether the synchronous pattern has already been detected. If the data SF is identified as 0, the received data RD is not a true data, and unit 600 proceeds to a clear BCT operation at 1268, where the output of the adder 608 is not transferred to the lines 1001. If the data SF is 0, and AND gates 668, 670, 672 are inhibited because two inputs to the OR gate 666 are both high. The unit 600, then, proceeds to a sync detected test operation at 1270, to know whether the shifted data AB is the same as the synchronous pattern. If no synchronous pattern is detected during the test operation at 1270, the unit 600 proceeds to the operation at 1266, where the data on the lines 1001 is written in the line memory 900. The data on the lines 1001 is the same as the data on the lines 925 except for the data BCT and the data AB. The unit 600 repeats these operations until the synchronous pattern is detected during the test operation 1270, when unit 600 proceeds to a set SF to 1 operation 1272. During this operation at, the high level output of the synchronous pattern detector 660 and the high level output of the AND gates 638 enable the AND gate 662, setting the data SF on the lines 1001 to 1. After this operation, the unit 600 proceeds to the operations from 1260 to 1258.

After the test operation at 1258, the unit 600 proceeds to the test operation at 1262, because the data SF is now equal to 1. Thus the unit 600 begins to receive the true data RD until 8 bits of data are all received. The operations that follow the test operation 1262 are quite the same as when the data CMD is equal to "10". Thus, the unit 600 finishes its operation for receiving 8 bits of data from the modems.

Figure 6:
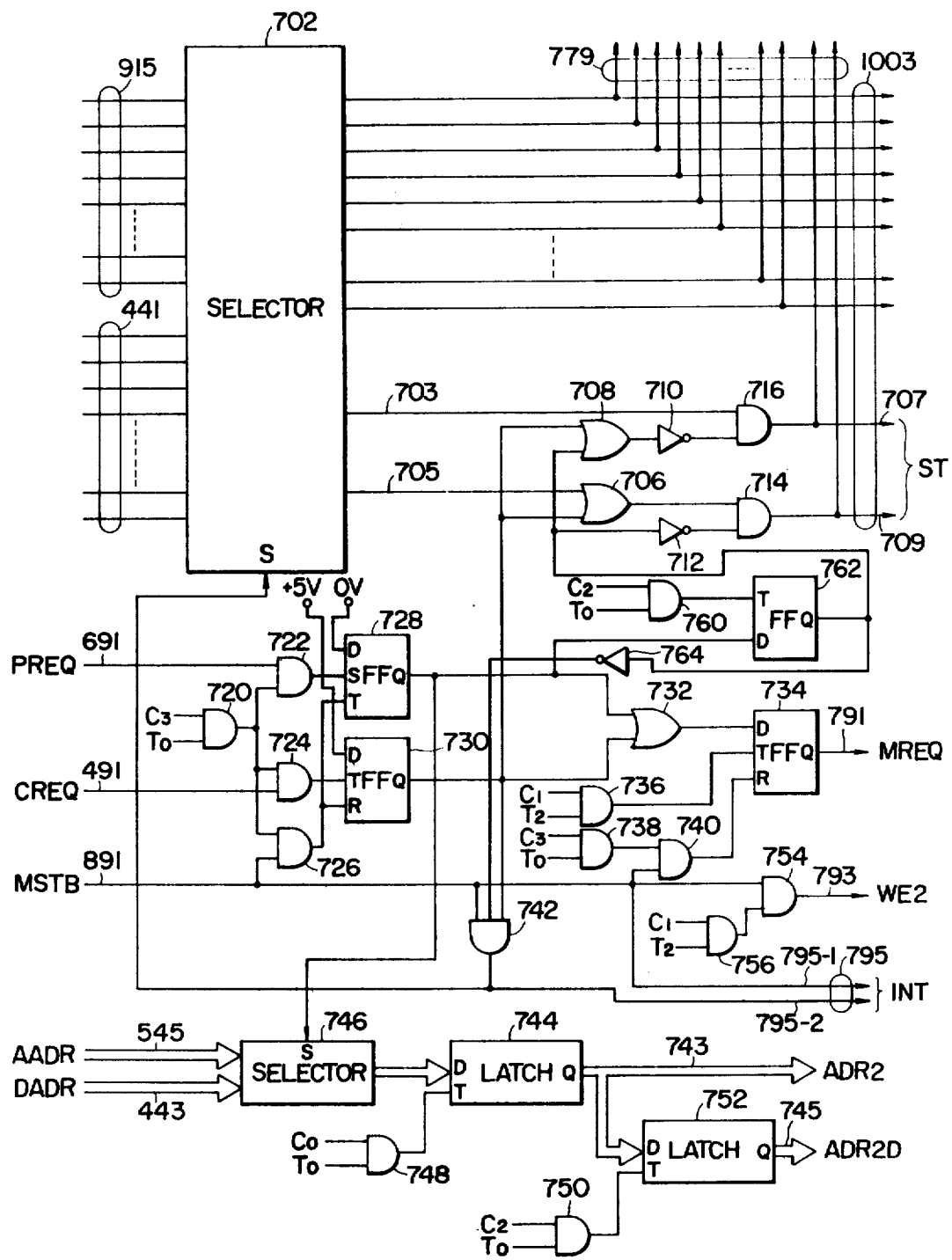
FIG. 6 is a logic circuit diagram of the control processing unit of this invention used in the communication control unit of FIG. 1.

Referring to FIG. 6, the unit 600 comprises a D-type flip-flops 728 with a low level (0 volt) input to its data input (D), which is set when the signal PREQ is supplied to its set signal input (S) by way of an AND gate 722. The AND gate 722 is enabled at the beginning of the period ($C_3$, $T_0$) by the output of an AND gate 720 which outputs a high level signal by the clock signals $C_3$, $T_0$. The output of the flip-flop 728 is supplied to a selector input (S) of a selector 746, which selects the signal AADR on the line 545 or the signal DADR on the line 443, depending on the signal supplied from the flip-flop 728 is high or not. Therefore, when the signal PREQ is not input to the AND gate at the beginning of period ($C_3$, $T_0$), the address DADR is selected.

The output of the selector 746 is input to a data input (D) of a latch 744, to be stored there at the beginning of the period ($C_0$, $T_0$) by a trigger signal supplied to its trigger input (T) from an AND gate 748, which outputs a high level signal when the clock signals $C_0$, $T_0$ are input. The signal ADR2 from the output (Q) of the latch 744 is sent to memory control unit 800 by way of a line 743 as an address signal for CPU 700 to read the line memory 900. The output signal of the latch 744 is input to a data input (D) of another latch 752, to be stored there at the beginning of the period ($C_2$, $T_0$) by a trigger signal supplied to its trigger input from an AND gate 750, which outputs a high level signal when the clock signals $C_2$, $T_0$ are input. The signal ADR2D from the output (Q) of the latch 752 is sent to memory control unit 800 by way of a line 745 as an address signal for CPU 700 to write the line memory 900. It should be understood that the address signal ADR2D takes the same address as the address signal ADR2, 400 nsec after the address signal ADR2 has changed and that the address signal ADR2D still remains unchanged until the period of 400 nsec passes after the address signal ADR2 has changed.

The output of the flip-flop 728 is input to a data input (D) of another flip-flop 734 by way of an OR gate 732, which is set at the beginning of a period ($C_1$, $T_2$) when a trigger signal is supplied to its trigger input (T) from an AND gate 736 by two clock signals $C_1$, $T_2$. The high level output signal MREQ is sent to memory control unit 800 by way of a line 791. The memory control unit 800, as explained later, sends back to CPU 700 a signal MSTB at the beginning of the period ($C_2$, $T_2$) under a certain condition. The signal MSTB indicates that the signal MREQ has been accepted by unit 800. The signal MSTB now enables an AND gate 754 during a period ($C_1$, $T_2$), when an AND gate 756 connected to the gate 754 outputs a high level signal by virtue of two clock signals $C_1$, $T_2$, with a result that a write enable signal WE2 is output to the line memory by way of a line 793. The address signal is, at this time, the signal ADR2D which is output from the latch 752, and is equal to the address stored in the latch 744 at the beginning of the period ($C_0$, $T_0$) of the preceding scanning period. Before writing data, CPU 700 reads the line memory 900 and modifies the read out data as follows.

The output of a flip-flop 728 is input to another flip-flop 762 which is set at the beginning of the period ($C_2$, $T_0$) if the flip-flop 728 has been set at the preceding period ($C_3$, $T_0$). The triggering pulses to its trigger input (T) of the flip-flop 762 is given by an AND gate 760 which is enabled when two clock signals $C_2$, $T_0$ are input. Therefore, after the flip-flop 762 has been set, its high level output from its data output (Q) disables an AND gate 742 with the aid of an invertor 764. As a result, a low level signal is input to a select signal input (S) of a selector 702, which selects the signals on the lines 915.

It is to be noted that to the lines 915, the latch 910 (FIG. 1) outputs data of the line memory at the location of the address ADR2 which is equal to the address of AADR at the preceding scanning period. Therefore, it is the same as the address of the communication channel for which unit 600 outputs the signal PREQ. The data ST on two lines 703, 705 of the output lines of the selector 702, are modified to be "00" in the presence of a high level output signal received from the flip-flop 762 by virtue of OR gates 706, 708, inverters 710, 712, AND gates 714, 716. The resulting data ST is output on the line 707, 709, which form part of the lines 1003. The data on the lines 1003 is sent to the line memory 900 by way of the line 1005 to be written in, by the write enable signal WE2 on the line 793. The data on the lines 779 is sent to a data processor 400 to be received. The data processor 400 receives the data on the line 779 by decoding an interrupt signal INT on the line 795. The signal on the line 795-1 is high because the signal MSTB is high now, while the signal on the line 795-2 is low because the AND gate 742 is disabled. Thus, CPU 700 conducts various operations when the signal PREQ is received. It must be noted that flip-flop 728 is reset at the beginning of the period ($C_3$, $T_0$) after the signal MSTB has been supplied from memory control unit 800 if no signal PREQ is supplied at that time. It is because the trigger signal to its trigger input (T) from an AND gate 726 becomes high, while 0 level signal is input to its set signal (S) as well as to its data input (D). If, however, the signal PREQ is again supplied at the beginning of the period ($C_3$, $T_0$) after the signal MSTB has been supplied from memory control unit 800, the flip-flop 728 is set inspite of a high level signal to its trigger input (T) and a low level signal signal to its data input (D), thus new signal PREQ being received by CPU 700.

When CPU 700 does not receive the signal PREQ but receives the signal CREQ, CPU 700 behaves differently. The signal CREQ sets the flip-flop 730 at the beginning of the period ($C_3$, $T_0$) when an AND gate 724 is enabled because the clock signals $C_3$, $T_0$ enable the AND gate 720. It must be noted now that we are supposing that the signal MSTB is not supplied to the AND gate 726 and that if the signal is supplied, the flip-flop 730 is reset at this time.

The low level output of the flip-flop 762, which remains reset because a low level signal is input from the flip-flop 728, is supplied to the selector 746, which selects the signal AADR.

The signal AADR is output as address signals ADR2, ADR2D from the latch 744, 752, respectively. The high level output of the flip-flop 730 sets the flip-flop 734, the signal M REQ being sent to memory control unit 800. If unit 800 sends back the signal MSTB, the signal MSTB enables the AND gate 742 with the aid of the hieh level output of the flip-flop 730 and the low level output of the flip-flop 728.

As a result, the selector 702 selects the data on the line. The selected signal on the lines 703, 705 is part of the data ST, which is modified in the circuits comprising the gates 706, 708, 710, 712, 714, 716 to "01". The data on the line 1003 thus selected and modified is sent to the line memory 900 to be written in. It must be remembered that CPU 700 generates the write enable signal WE2 at the period ($C_1$, $T_2$) because the signal MSTB is supplied. Similarly, the interrupt signal INT is sent back to the data processor, which decodes the signal. It is to be noted that the signals on the lines 795 are both high. It must be noted again that flip-flops 730 and 734 are reset at the beginning of the period ($C_3$, $T_0$).

These are the explanations of the configuration and operation of CPU 700. The operations are summarized in FIG. 12, where operations based on receipt of the signal PREQ are designated as operations 1300, 1320, 1322, 1326, 1330, 1332 and operations based only on the signal CREQ are designated as operations 1300, 1310, 1312, 1314, 1316, 1330, 1332.

The signal CREQ is output from the data processor 400 when it requires CPU 700 to communicate with the modems. The data to be sent, which accompanies the signal CREQ, from the data processor 400 to CPU 700 is a little different depending on the situation. When the data processor wants to monitor one of the modems, it sends the address data DADR correspond to the modem to be monitored as well as monitor command data "00" for the data CMD. When the data processor wants to control a modem it must send "01" for the data CMD. When the data processor wants to send data to a modem, it must send 8 bits of data AB as well as data "10" for the data CMD. When the data processor wants to receive data from a modem, it must send "0" for the data SF to initialize the data, as well as data "11" for the data CMD.

Figure 7:
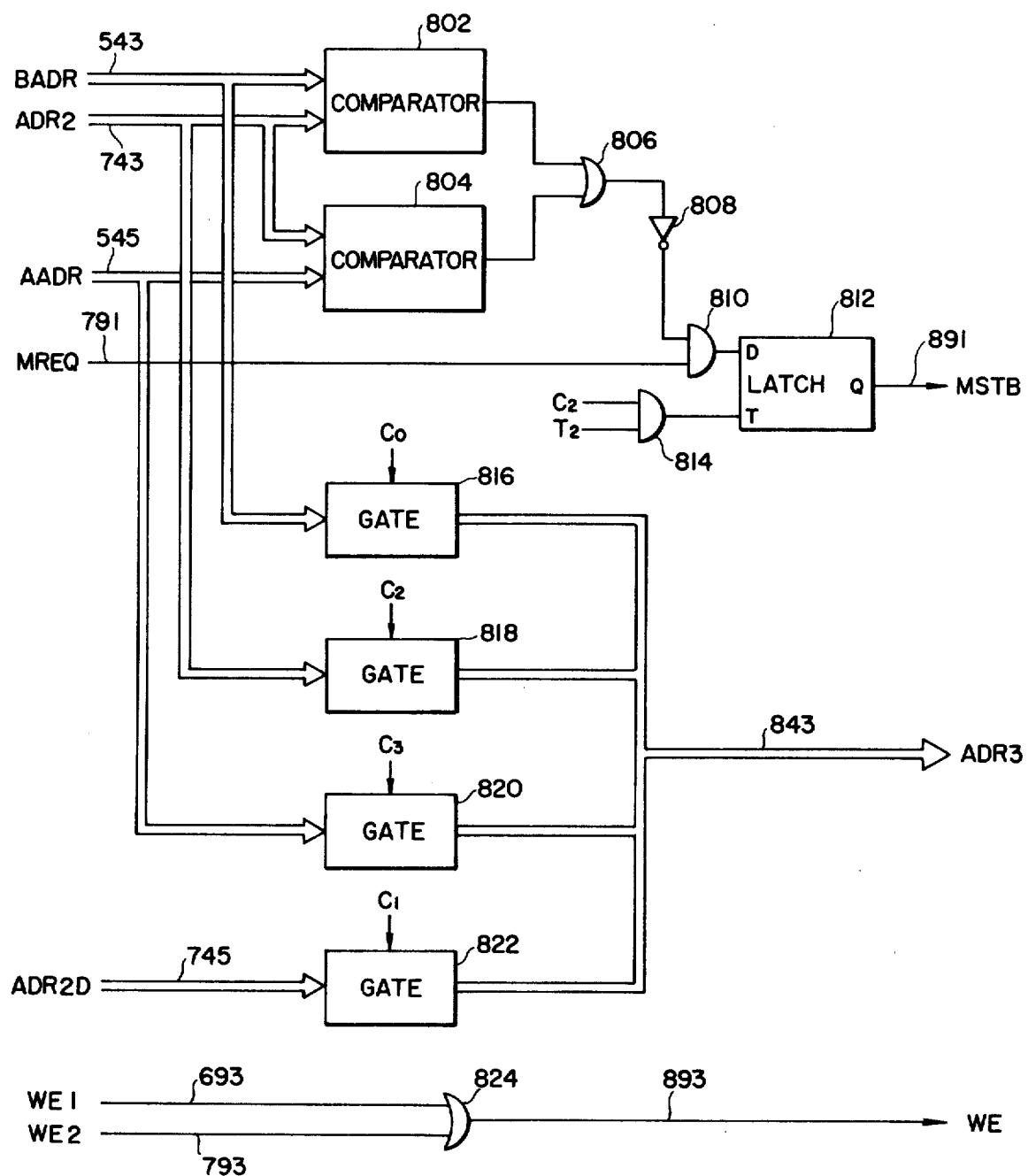
FIG. 7 is a logic circuit diagram of the memory control unit of this invention used in the communication control unit of FIG. 1.

Referring to FIG. 7, memory control unit 800 comprises comparators 802, 804, the former of which outputs a coincidence signal when the address signal BADR on the line 543 and the address signal ADR2 on the line 743 are the same, the latter of which outputs a coincidence signal when the address signal ADR2 on the line 743 and the address signal AADR on the line 545 are the same.

The coincidence signal of either comparator 802, 804 is sent to an AND gate 810 by way of an OR gate 806 and an inverter 808.

The signal MREQ is supplied to an data input (D) of an latch 812 by way of the AND gate 810. The AND gate 810 is disabled when a coincidence signal is output from either comparator 802, 804. The latch 812 stores the signal applied to its data input (D) when a high level signal is applied to its trigger input (T).

An AND gate 814 whose output is connected to the trigger input (T) of the latch 812, generates a high level output when clock signals $C_2$ and $T_2$ are input simultaneously. The output signal MSTB of the latch 812 is sent back to the CPU 700 by way of a line 891.

It is to be noted that when the comparator 802 or 804 outputs a coincidence signal at the time ($C_2$, $T_2$), the latch 812 does not output the signal MSTB after the period ($C_2$, $T_2$), prohibiting the write enable signal WE1 and an interrupt signal INT to be output from the gate 745 (FIG. 6).

The memory control unit 800 further comprises four gates 816, 818, 820 and 822, to which are input the different address signals BADR on the line 543, ADR2 on the line 743, AADR on the line 545 and ADR2D on the line 745, respectively. These four gates are enabled when clock signals $C_0$, $C_1$, $C_2$ and $C_3$ are applied, respectively. The outputs of these gates are sent to the common bus 843, the address signal ADR3 on the bus being sent to the line memory 900. It is to be noted that when the memory access address is controlled like this, the coincidence of the address referred to above occurs in the following cases.

The coincidence of the address BADR and ADR2 at the time ($C_2$, $T_2$) occurs when the data processor requires CPU 700 to modify the data in the same address area of the line memory 900 whose area interface control unit 600 is going to read before CPU 700 writes the modified data in the area. The coincidence of the address AADR and ADR2 occurs when the data processor requires CPU 700 to read from and write in the same address area of the line memory 900 as the area whose data unit 600 is now modifying. Therefore, when the coincidence of addresses referred to above occurs, the signal MSTB should not be output, to prohibit CPU 700 to generate the write enable signal WE2.

It must be noted that the address signal DADR accepted at the beginning of the period ($C_3$, $T_0$) within a scanning period, for example, $S_i$, the address DADR output as the ADR3 during the period ($S_{i+1}$, $C_2$), when the address BADR is equal to #(i+2) and the address AADR is equal to #(i+1). Therefore, coincidence occurs when the address DADR received at the beginning of the period ($S_i$, $C_3$, $T_0$) is equal to (i+1) or (i+2).

The memory control unit 800, furthermore comprises an OR gate 824 to which is input write enable signals WE1 on the line 693 and WE2 on the line 793. The output signal WE of the OR gate 824 is sent to the line memory by way of a line 893 as a write enable signal.

It is to be noted further that in FIG. 7 the input address to the gate 816 can be replaced by the signal AADR, because the signals AADR and BADR are the same at the period $C_0$.

Figure 10:
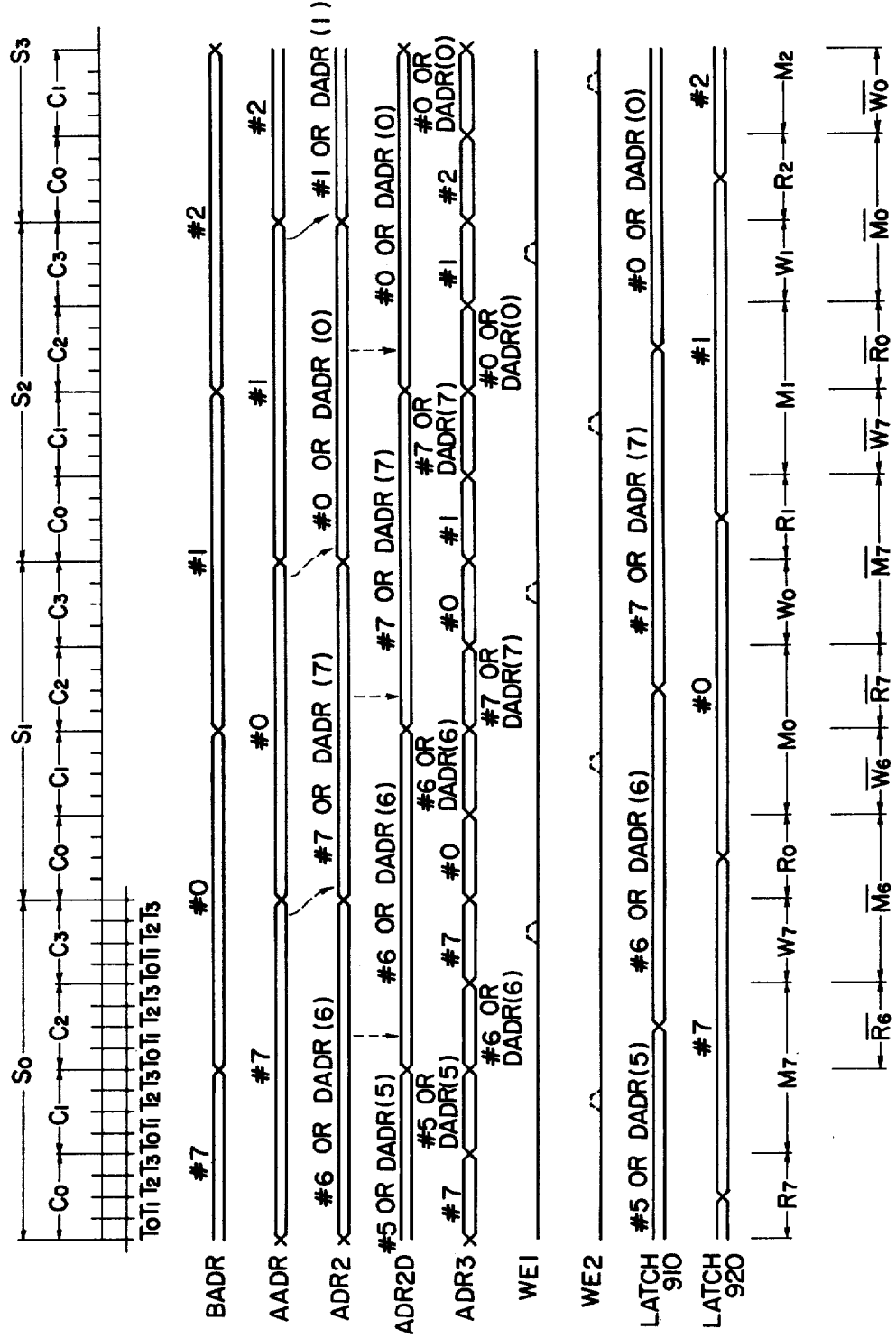
FIG. 10 is a signal level diagram of signal level transitions at various locations in the communication control unit of FIG. 1 related to its operations of reading or writing the line memory of FIG. 1.

In FIG. 10 is shown how the various address signals used in the present embodiments change with time, as well as some related signals. The number written above the address signals BADR, AADR, ADR2, ADR2D are examples of the address numbers represented by those address signals. The symbols such as DADR(6), DADR(7) and so on written above the address signals ADR2, ADR2D, ADR3 are examples of the address signals DADR sent from the data processor 400 to CPU 700. It is to be remembered that the address ADR3 is the address supplied to the line memory and that the address ADR3 is equal to BADR, ADR2D, ADR2 and AADR in the periods $C_0$, $C_1$, $C_2$ and $C_3$, respectively. It must be noted that addresses ADR2, ADR2D are not definite in the sense that they may be equal to the address DADR.

In FIG. 10, the period Ri such as $R_0$, $R_1$ represents a period where interface control unit 600 reads out the data for the i-th communication channel from the line memory 900, the period Mi such as $M_0$, $M_1$, represents a period where unit 600 modifies the readout data for the i-th channel and the period Wi such as $W_0$, $W_1$ represents a period where unit 600 writes the modified data for the i-th channel in the line memory 900. The period $\overline{Ri}$ such as $\overline{R_6}$, $\overline{R_7}$ represents a period where CPU 700 reads the data for the i-th communication channel from the line memory 900. The period $\overline{Mi}$ represents a period where CPU 700 modifies the read out data and the period $\overline{Wi}$ represents a period where CPU 700 writes the modified data in the line memory 900.

It is to be noted, however, that these operations of CPU 700 are not accomplished unless unit 600 has not finished its operation for the i-th channel, that is, unit 600 has not output the signal PREQ in the period Mi. When the data processor 400 inputs to CPU 700 the signal CREQ in the period Mi, as well as the address data DADR and its related data to be written in the line memory 900, CPU 700 performs a similar operation in the periods $\overline{Ri}$, $\overline{Mi}$, $\overline{Wi}$ for the address DADR and its related data under the condition that in the period Mi, unit 600 did not input the signal PREQ to CPU 700 and that the address DADR does not coincide with i+1 or i+2.

It is clear from the explanation above that the present invention is not limited to full duplexed communication and that the present invention is also applicable to half-duplex communication. For half-duplex communication, line adapters and modems must be adapted for such operation. Modems for half-duplex communication available in the market are applicable to the present invention.

Line adapters half duplex communication applicable to the present invention are different from the line adapters described in the previous embodiments in that one memory means such as the flip-flop 158 is enough instead of the two memory means such as the flip-flops 156 and 158, and one switching means such as the AND gate 150 is enough instead of the two switching means such as AND gates 150, 152. Therefore, only one request signal such as RREQ is enough instead of two request signals SREQ, RREQ, with the result that the OR gate 174 is unnecessary. Of course, interface control unit 600 must be modified so as to be supplied with the signal RREQ to inputs where in the previous embodiments the signal SREQ is supplied.

Furthermore, decoders 120, 130 must be modified for half duplex communication so as to select one of pairs of line adapters and modems depending on the full bits of the address signals BADR, AADR, without neglecting the least significant bit. When modified like this, the communication control system of the previously described embodiments can communicate with 8 half duplexed communication channels of 96k bits/sec with the same scanning and the same repetition period.

In summary, therefore, it can be seen that this invention provides a communication control unit that controls fast data transfer between a data processor and a plurality of modems by scanning the line adapters with two address signals. Obviously, many modifications are possible in the light of the above teachings. It is, therefore, to be understood that within the scope of the following claims the invention may be practiced in modified form.

What is claimed is:

1. A communication control system for controlling data transfer between a data processor and a plurality of communication channels, each of which channels comprises a pair of elements including a line adapter and a modem, comprising a communication control unit to communicate with said data processor, a line control unit to communicate with said modems, and connecting means for connecting said communication control unit to said line control unit, said line control unit comprising:

a plurality of line adapters each connected to a respective one of said modems and including first switching means for transmitting input data sent from said one of said modems to said communication control unit in response to a first enabling signal, command outputting means for outputting at least one command signal to be received by said communication control unit, memory means for storing said command signal until a reset signal is supplied thereto, second switching means for transmitting said command signal sent from said memory means, said second switch means being responsive to said first enabling signal, and third switching means for transmitting output data sent from said communication unit to said one of said modems in response to a second enabling signal, first decoding means for supplying said first enabling signal selectively to one of said line adapters in response to an address signal, and second decoding means for supplying said second enabling signal to said third switching means;

said communication control unit comprising:

first address signal generator means for outputting different address signals identifying each of said communication channels continuously during a predetermined scanning period and cyclically with a predetermined repetition period, second address signal generator means for outputting the same address signals as are generated by said first address signal generator means with a predetermined time delay, continuously during said predetermined period and cyclically with said predetermined repetition period, storage means for storing data related to each of said communication channels at address locations corresponding to each of said communication channels, means for supplying an address signal which has the same value as is generated by said second address signal generator means to said storage means when input data from one of said line adapters which has the same address as is generated by said second address generator means reaches said communication control unit; and said connecting means comprising:

means for inputting an address signal comprising at least a plurality of bits of said first address signal except for its least significant bit to said first decoder means, means for inputting an address signal comprising at least a plurality of bits of said second address signal except for its least significant bit to said second decoder means.

2. A communication control system of claim 1 wherein said predetermined delay time is equal to half of said predetermined scanning period.

3. A communication control system of claim 1 wherein one pair of said line adapters and said modems form a full duplexed communication channel.

4. A communication control system of claim 3 wherein one pair of said line adapters and said modems form a half duplexed communication channel.

5. In a communication control system including a data processor, a plurality of modems, a line control unit forming a plurality of communication channels each connected to a respective modem, and a communication control unit for controlling transfer of data between said data processor and selected communication channels in said line control unit, the improvement comprising first and second address signal generator means in said communication control unit each generating the same address signals identifying said communication channels continuously during a predetermined scanning period and cyclically with a predetermined repetition period, the address signals generated by said second address signal generator means being delayed with respect to the address signals generated by said first address signal generator means by a predetermined delay time;

a plurality of line adapters each including first and second switching means in said line control unit for transferring data to and from a selected modem, respectively; and first and second decoder means in said line control unit responsive to the address signals generated by said first and second address signal generator means, respectively, for generating first and second enabling signals, respectively, which enable said respective first and second switching means in a selected line adapter.

6. A communication control system of claim 5 wherein said line adapters each further include command outputting means for outputting at least one command signal to be received by said communication control unit, memory means for storing said command signal, and third switching means responsive to said first enabling signal for transmitting said command signal from said memory means to said communication control unit.

7. A communication control system of claim 5 wherein said communication control unit further includes storage means for storing data related to each of said communication channels at address locations assigned to said channels, and means for supplying an address signal which has the same value as that generated by said second address signal generator means to said storage means when input data from one of said line adapters having the same address reaches said communication control unit.

8. A communication control system of claim 5, further including means for connecting the output of said first address signal generator means except for the least significant bit thereof to said first decoder means.

9. A communication control system of claim 5, further including means for connecting the output of said second address signal generator means except for the least significant bit thereof to said second decoder means.

* * * * *